(12) United States Patent
Kanazawa et al.

(10) Patent No.: US 8,651,882 B2
(45) Date of Patent: Feb. 18, 2014

(54) ELECTRICAL JUNCTION BOX

(75) Inventors: Masashi Kanazawa, Yokkaichi (JP); Tatsuya Hayakawa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 168 days.

(21) Appl. No.: 13/220,944

(22) Filed: Aug. 30, 2011

(65) Prior Publication Data

US 2012/0135619 A1 May 31, 2012

(30) Foreign Application Priority Data

Nov. 26, 2010 (JP) ................................. 2010-263618

(51) Int. Cl.
*H01R 13/62* (2006.01)

(52) U.S. Cl.
USPC ......................................................... 439/157

(58) Field of Classification Search
USPC ......................................................... 439/157
See application file for complete search history.

(56) References Cited

U.S. PATENT DOCUMENTS

| | | | | |
|---|---|---|---|---|
| 5,178,553 A | * | 1/1993 | Hatagishi et al. | 439/157 |
| 6,312,273 B1 | * | 11/2001 | Hasegawa et al. | 439/157 |
| 7,445,474 B2 | * | 11/2008 | Sakatani et al. | 439/157 |
| 2002/0022400 A1 | * | 2/2002 | Ushio et al. | 439/577 |

FOREIGN PATENT DOCUMENTS

JP   2010-140646   6/2010

* cited by examiner

*Primary Examiner* — Renee Luebke
*Assistant Examiner* — Larisa Tsukerman
(74) *Attorney, Agent, or Firm* — Greenblum & Bernstein, P.L.C.

(57) ABSTRACT

An electrical junction box having a structure in which a lever of a lever type connector engages a connector hood and a deflection of a wall portion can be prevented without increasing of a resin amount. Latch projections protrude from a wall portion of the connector hood toward the inside of the connector hood. The latch projections engage guide grooves in a lever of a connector. A plurality of lightening holes are formed in the wall portion. The latch projections are supported on a solid part of the wall portion that is not provided with the lightening holes.

15 Claims, 10 Drawing Sheets

(a)

(b)

(a)

(b)

ELECTRICAL JUNCTION BOX

CROSS-REFERENCE TO RELATED APPLICATIONS

The present application claims priority under 35 U.S.C. §119 of Japanese Application No. 2010-263618, filed on Nov. 26, 2010, which is herein expressly incorporated by reference in its entirety.

TECHNICAL FIELD

This invention relates to an electrical junction box provided with a connector hood for containing a connector, and more particularly relates to an electrical junction box in which a latch projection is formed on the connector hood to engage a lever on the connector.

BACKGROUND ART

As well known, a connector provided on an end of an external electrical wire is connected to an electrical junction box. Such electrical junction box has been disclosed in, for example, JP 2010-140646 A. A lever type connector having a lever can be coupled to the electrical junction box. A guide groove is formed in the lever to engage a latch projection on the connector hood. When the lever is operated, the latch projection engages the guide groove so that they can exert a guiding action. The connector can be displaced in inserting and drawing directions with respect to the connector hood, thereby easily inserting and drawing the connector into and from the connector hood.

When the lever type connector is coupled to the connector hood by operating the lever, all coupling forces for electrically connecting the connector to a plurality of terminals are applied to the lever and the latch projection. Since an acting force to the latch projection causes a deflection of a wall portion of the connector hood from which the latch projection protrudes, the wall portion of the connector hood requires an adequate strength.

In this respect, in the case where the latch projection is provided on an outer peripheral surface of the connector hood, even if an external force applied to the latch projection deflects slant the wall portion inside or outside the connector hood, it is possible to prevent an excessive slant deflection since the wall portion of the connector hood can be pinched between the lever and the connector.

However, in the case where the latch projection protrudes from an inner surface of the connector hood, as described in JP 2010-140646 A, the wall portion of the connector hood is likely to be deflected greatly by an acting force to the latch projection. If an amount of deflection of the wall portion of the connector hood becomes great, there is a possibility that an acting resistance between the lever and the latch projection will increase and a malfunction in action will be caused upon coupling and decoupling of the connector, as well as a deformation or a breakage of the wall portion.

It may be contemplated to increase a thickness of the wall portion of the connector hood so as to enhance a strength of the wall portion. However, increases of a cost in production and a weight of products on account of an increase of a resin amount cannot be avoided, even if a thickness of the wall portion is merely increased. In addition, a shrinkage cavity will be caused due to a resin shrinkage upon molding and this will cause failures of products and deteriorations in quality. It may be also contemplated to provide a reinforcement rib on an outer peripheral surface of the connector hood. However, it is difficult in many cases to provide an adequate reinforcement rib on the surface on account of limitation in space. Particularly, in the case where a plurality of connector hoods are adjacent to one another, it is impossible to provide the reinforcement rib on the outer peripheral surface of the wall portion.

[Prior Art Document]
[Patent Document]

DISCLOSURE OF THE INVENTION

Problems that the Invention is to Solve

In view of the above problems, an object of the present invention is to provide an electrical junction box having a new structure in which a lever of a lever type connector engages a connector hood and a deflection of a wall portion can be prevented without increasing an amount of a resin.

Means for Solving the Problems

A first aspect of the present invention is directed to an electrical junction box wherein a connector hood is adapted to contain a connector, the connector hood is provided with a latch projection, and the latch projection guides and displaces the connector in inserting and drawing directions with respect to the connector hood when the latch projection engages a guide groove in a lever provided in the connector in association with an operation of the lever. The electrical junction box is characterized in that: the latch projection protrudes from a wall portion of the connector hood toward the inside of the connector hood; a plurality of lightening holes are formed in the wall portion; and the latch projection is supported on a solid part of the wall portion in which the lightening holes are not formed.

According to the electrical junction box in the first aspect of the present invention, in the case where the latch projection protrudes from the inner peripheral surface of the connector hood, it is possible to enhance a strength of the wall portion by substantially increasing a thickness of the wall portion by means of forming the lightening holes in the wall portion that supports the latch projection, while an increase of an amount of a resin can be avoided. In particular, since the solid part, in which the lightening holes are not provided, supports the latch projections while the lightening holes are provided in the wall portion, it is possible to effectively obtain a support strength for the latch projection. Thus, it is possible to prevent the wall portion from being deflected while lowering a possibility of an increase of a cost in production due to an increase of an amount of a resin and a possibility of faulty components due to a shrinkage cavity upon molding.

A second aspect of the present invention is directed to the electrical junction box according to the first aspect. In the electrical junction box in the second aspect, the latch projection includes an insertion leg to be inserted into the guide groove in the lever, and a head portion that extends widely over a width of the guide groove at a projection distal end of the head portion.

According to the electrical junction box in the second aspect of the present invention, the head portion of the latch projection contacts with both inner edge surfaces of the guide groove when the lever of the connector is operated. Thus, it is possible to effectively prevent the wall portion from being deflected outward by engaging the latch projection with the lever. In result, even if the latch projection is provided on the inner peripheral surface of the wall portion of the connector hood, it is possible to prevent the wall portion from being deflected outward.

A third aspect of the present invention is directed to the electrical junction box according to the first or second aspect. In the electrical junction box in the third aspect, a plurality of connector hoods are adjacent to one another, the wall portion includes partition walls among the adjacent connector hoods, the lightening holes are formed in the wall portion, and a plurality of latch projections protrude from the solid part toward the insides of the adjacent connector hoods.

According to the electrical junction box in the third aspect of the present invention, since the latch projection is provided on the inner peripheral surface of the wall portion of the connector hood, it is possible to form a plurality of connector hoods that are adjacent to one another and that share the partition walls in a high efficiency in space. In the case where the plural connector hoods are adjacent to one another, it is difficult to provide a reinforcement rib on the wall portion. However, if the present invention is applied to the partition walls among the plural connector hoods, it is possible to obtain an adequate support strength of the latch projection. If the plural connector hoods share the partition walls, it is possible to substantially increase a thickness of the wall portion that supports the latch projection and to enhance a strength of the wall portion while restraining an amount of a resin for a whole wall portion from increasing.

A fourth aspect of the present invention is directed to the electrical junction box according to the third aspect. In the electrical junction box in the fourth aspect, the latch projections that protrude toward the insides of the connector hoods are disposed on the same positions on the wall portion that includes partition walls among the adjacent connector hoods, and the latch projections are coupled together to one another through the solid part.

According to the electrical junction box in the fourth aspect of the present invention, since the latch projections on the adjacent connector hoods are coupled together to one another through the both sides of the solid part of the partition wall, it is possible to efficiently enhance a stiffness of the latch projection and of the whole partition wall that supports the latch projections without increasing an amount of a resin. When the lever of the one connector hood engages the latch projections, it is possible to obtain a support effect against an engagement between the lever of the other connector hood and the latch projections. Thus, it is possible to obtain a mutual reinforcement effect caused by an engagement between the levers and the latch projections of the adjacent connector hoods through the partition wall, thereby more effectively preventing the partition wall from being deflected.

A fifth aspect of the present invention is directed to the electrical junction box according to any one of the first to fourth aspects. In the electrical junction box in the fifth aspect, positioning projections are provided on the connector hood so that the positioning projections pinch and position the connector in the connector hood.

According to the electrical junction box in the fifth aspect of the present invention, since the latch projection that engages the lever of the connector hood protrudes from the inner peripheral surface, the lever is interposed between the wall portion and the connector main body and a clearance will be likely to be causes between the connector main body and the wall portion. Accordingly, it is possible to prevent the connector from causing any backlash and play in the connector hood by pinching the connector by the positioning projections.

More preferably, the positioning projections are disposed near the connecting terminals that protrude to the inside of the connector hood to extend toward the opening in the connector hood over the connecting terminals. Thus, if the connector is slant inserted into the connector hood, the connector contacts with the positioning projections before the connector contacts with the connecting terminals, thereby guiding the connector in the regular inserting direction and protecting the connecting terminals against the slant contact with the connector.

A sixth aspect of the present invention is directed to the electrical junction box according to any one of the first to fifth aspects. In the electrical junction box in the sixth aspect, a positioning groove is provided in a wall portion from which the latch projection protrudes in the connector hood, the positioning groove is open in a projection end surface of the wall portion and extends in a depth direction, and a fitting projection provided on the connector is coupled to the positioning groove.

As described above, in the case where the latch projection protrudes to the inside of the connector hood, a relatively great clearance will be caused between the connector hood and the connector main body and this will make it difficult to position the connector. According to the sixth aspect of the present invention, since the positioning groove is open in the projection end surface of the wall portion of the connector hood, it is possible to position and guide the connector with respect to the connector hood at the beginning of attaching the connector to the connector hood by coupling the fitting projection to the positioning groove.

Effects of the Invention

According to the present invention, the latch projection that engages the guide groove in the lever of the connector protrudes to the inside of the connector hood. A plurality of lightening holes are provided in the wall portion from which the latch projection protrudes. The latch projection is supported on the solid part of the wall portion that is not provided with the lightening holes. Thus, it is possible to enhance a support strength for the latch projection while restraining the amount of a resin from increasing, and it is possible to prevent the wall portion from being deflected upon inserting and drawing the connector.

BRIEF EXPLANATION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

PREFERRED ASPECTS OF EMBODYING THE INVENTION

Figure 1:
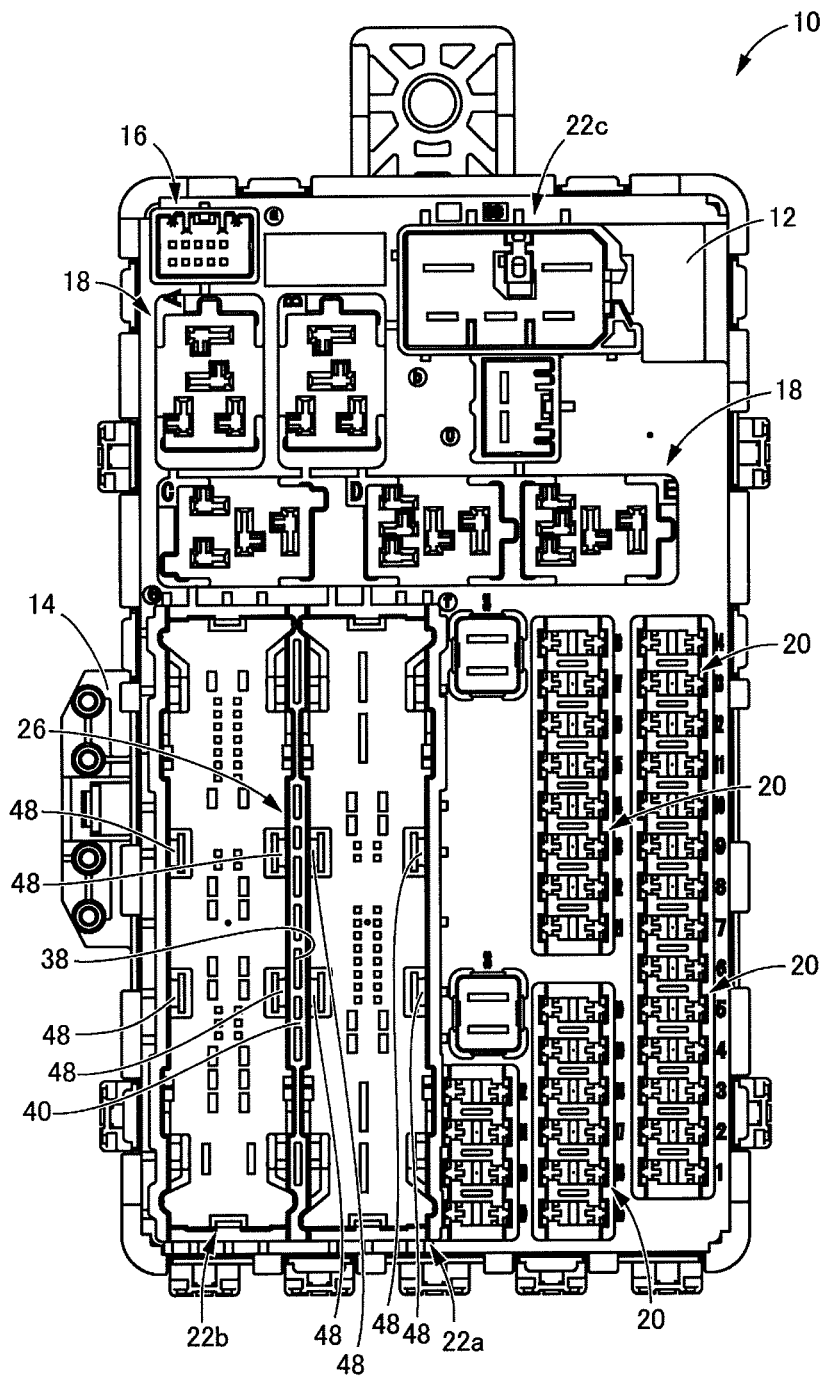
FIG. 1 a plan view of a first embodiment of an electrical junction box in accordance with the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Referring now to the drawings, embodiments of an electrical junction box in accordance with the present invention will be described below.

FIG. 1 shows a first embodiment of an electrical junction box 10 in accordance with the present invention. The electrical junction box 10 includes an upper casing 12 made of a synthetic resin and a lower casing 14 made of a synthetic resin. A printed board 28 and a bus bar 30 (see FIGS. 4 and 5) are contained in a space between the upper and lower casings 12 and 14. Connecting terminals 32 (mentioned after) are omitted from FIGS. 4 and 5 (mentioned after). Hereinafter, upper and lower directions define upper and lower directions in FIGS. 3 to 5, except where specifically noted.

The upper casing 12 is provided with a connector-mounting area 16, a relay-mounting area 18, a fuse-mounting area 20, and the like. These areas have been known in the prior art. Furthermore, the upper casing 12 is provided with connector-mounting sections 22a, 22b, 22c for lever type connectors.

Figure 2:
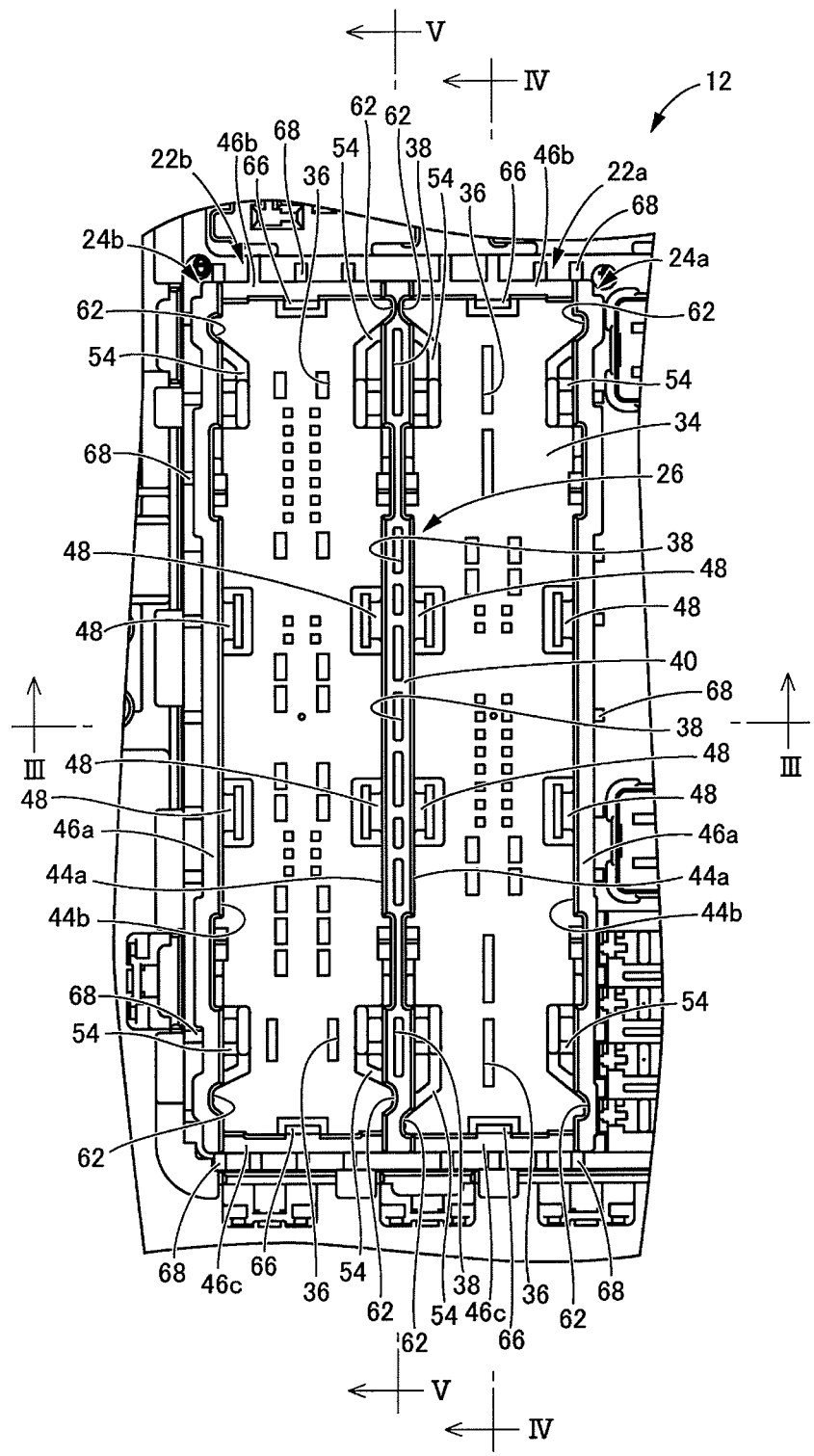
FIG. 2 is an enlarged plan view of a main part of the electrical junction box shown in FIG. 1.
Figure 3:
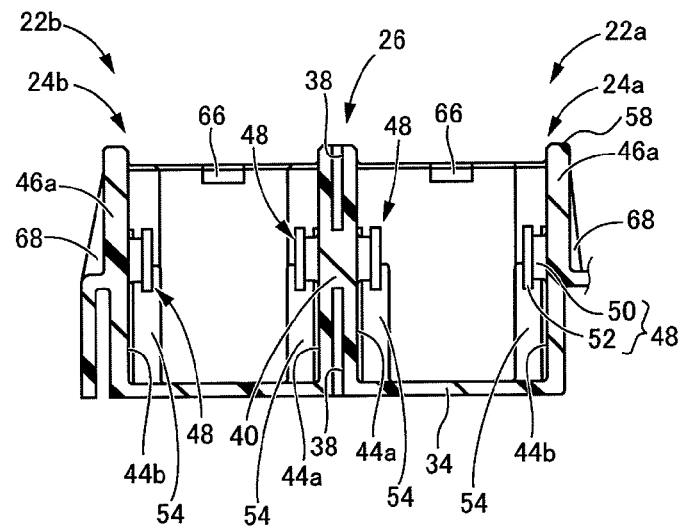
FIG. 3 is a cross section view of the electrical junction box taken along lines III-III in FIG. 2.
Figure 4:
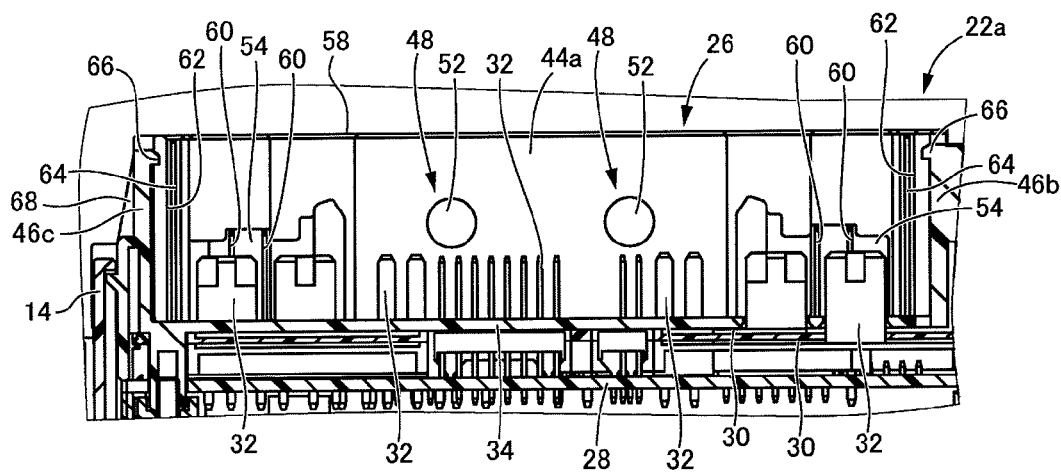
FIG. 4 is a longitudinal section view of the electrical junction box taken along lines IV-IV in FIG. 2.
Figure 5:
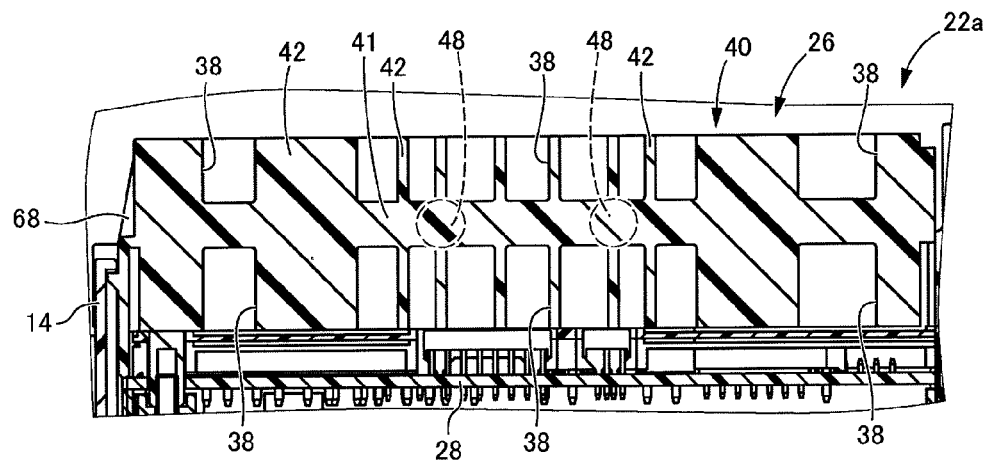
FIG. 5 is a longitudinal section view of the electrical junction box taken along lines V-V in FIG. 2.

FIGS. 2 and 3 show the connector-mounting sections 22a and 22b for the lever type connectors while FIGS. 4 and 5 show the connector-mounting section 22a for the lever type connector. Since the connector-mounting sections 22a and 22b for the lever type connectors substantially have the same structures as each other, the connector-mounting section 22a for the lever type connector will be described hereinafter, if it is not necessary to discriminate between the sections 22a and 22b. Explanations as to the connector section 22b for the lever type connector are omitted merely by giving the same signs to the drawings. The connector-mounting sections 22a and 22b for the lever type connectors include connector hoods 24a and 24b that are open upward from the upper casing 12. The connector hoods 24a and 24b are formed into rectangular peripheral wall shapes that project upward from the upper casing 12. The connector hoods 24a and 24b substantially have the same sizes as each other. Adjacent longitudinal sides out of rectangular peripheral walls define a common partition wall 26. As shown in FIG. 4, in the connector-mounting sections 22a for the lever type connector, connecting terminals 32 are provided on the printed board 28 and bus bar 30 that are contained in the space between the upper casing 12 and the lower casing 14, and the connecting terminals 32 project through terminal-receiving holes 36 in a bottom portion 34 into the hood 24a.

The partition wall 26 is provided with a plurality of lightening holes 38. The lightening holes 38 are aligned in an extending direction (upper and lower directions in FIG. 2) of the partition wall 26 and are spaced apart from one another by suitable distances. Thus, the partition wall 26 has a dimension in thickness (dimension in right and left directions in FIG. 2) greater than the other walls of the connector hood 24a at positions in which at least lightening holes 38 are formed. As shown in FIG. 5, the lightening holes 38 are formed in upper and lower sides of the partition wall 26. The lightening holes 38 are formed into closed-end slit-like recesses that are open upward or downward from the upper casing 12. A solid part made of a resin material is formed on a part in which the lightening holes 38 are not provided.

In the first embodiment, a plurality of lightening holes 38 in the upper and lower sides of the partition wall 26 have the same dimensions in depth (upper and lower directions in FIG. 5). Thus, the solid part 40 is provided with a longitudinal continuous portion 41 (see FIG. 5), which extends along a whole length of the partition wall 26 in the longitudinal direction (right and left directions in FIG. 5), on an intermediate part in the upper and lower directions of the partition wall 26 and on a part between the upper and lower lightening holes 38. Furthermore, since the upper and lower lightening holes 38 and 38 are symmetric with respect to the upper and lower directions, the partition wall 26 is provided on a part between the lightening holes 26 in the longitudinal direction with a plurality of vertical continuous portions 42 (see FIG. 5) that extend along the whole length of the partition wall 26 in the upper and lower directions.

Latch projections 48, 48 protrude from and are integrated with inner peripheral surfaces 44a of the partition wall 26 and inner peripheral surfaces 44b of a wall portion 46 opposed to the inner peripheral surfaces 44a of the partition wall 26 in the connector hood 24a, respectively. The latch projections 48, 48 protruding from the inner peripheral surfaces 44a and 44b have the same configurations as each other. Each latch projection 48 includes a cylindrical insertion leg 50 that protrudes from the inner peripheral surface 44a (or 44b) toward the inside of the connector hood 24a, a disk-like head portion 52 that is provided on a distal end of the insertion leg 50 to extend outward over a whole periphery of the insertion leg 50 so that a dimension in diameter of the head portion 52 is greater than that of the insertion leg 50. The dimension in diameter of the head portion 52 is greater than a dimension in width of a guide groove 94 in a connector 70a (mentioned after).

These latch projections 48, 48 are opposed to each other in the short side direction (right and left directions in FIG. 2) of the connector hood 24a and are aligned on the same central axis. In the first embodiment, two pairs of latch projections 48, 48 that protrude from the inner peripheral surfaces 44a and 44b are spaced apart from each other in the longitudinal direction of the connector hood 24a.

As shown in FIG. 5, the two latch projections 48, 48 that protrude from the partition wall 26 to the inside of the connector hood 24a are provided on the solid part 40 of the partition wall 26. Particularly, in the first embodiment, each latch projection 48 that protrudes from the partition wall 26 disposes its central axis at an intersection point between the longitudinal continuous portion 41 on the solid part 40 and the upper and lower directional continuous portion 42.

In addition, as shown in FIGS. 2 and 3, a central axis of the latch projection 48 that protrudes from the partition wall 26 to the inside of the connector hood 24a accords with a central axis of the latch projection 48 that protrudes from the partition wall 26 to inside of the connector hood 24b. These latch projections 48, 48 are disposed on the same position on the partition wall 26 to protrude from the same position to opposite directions from each other. Thus, the latch projection 48 that protrudes from the partition wall 26 to the inside of the connector hood 24b is also provided on the solid part 40. The latch projection 48 that protrudes from the partition wall 26 to the inside of the connector hood 24a is integrated through the solid part 40 with the latch projection 48 that protrudes from the partition wall 26 to the inside of the connector hood 24b.

The connector hood 24a is provided on each of its inner four corners with a positioning projection 54. Four positioning projections 54 are disposed on a slightly inside of a longitudinal end edge of the connector hood 24a to approach the connecting terminals 32 (see FIG. 4) that protrude to the inside of the connector hood 24a. The positioning projections 54 protrude from an inner peripheral surface 44a of the partition wall 26 and an inner peripheral surface 44b opposed to the surface 44a to the inside of the connector hood 24a. Each positioning projection 54 protrudes upward from the bottom portion 34 so that the positioning projection 54 does not reach a projecting end surface 58 of the connector hood 24a. Preferably, the positioning projection 54 has a projection size greater than the connecting terminals 32 that protrude from the bottom portion 34. Furthermore, each positioning projection 54 is provided on its projecting end surface toward the inside of the connector hood 24a with a pair of ribs 60, 60 that extend upward from the bottom portion 34. The ribs 60, 60 can position the connector 70a more stably and have small contact area between the connector 70a and the positioning projection 54 so as to insert and draw the connector 70a into and from the connector hood 24a more readily.

Furthermore, the connector hood 24a is provided in each of its four corners with a positioning groove 62. Each positioning groove 62 is provided at a side of a longitudinal end edge of the connector hood 24a apart from the positioning projection 54 in the inner peripheral surface 44a of the partition wall 26 provided with the latch projection 48 and in the inner peripheral surface 44b of the wall portion 46a. The positioning grooves 62 are open in the inner peripheral surfaces 44a and 44b and extend through a whole depth of the connector hood 24a in the projecting direction (upper and lower directions in FIG. 4) from the bottom portion 34 of the partition wall 26 and wall portion 46a. An extending end of each positioning groove 62 is open in the projecting end surface 58 of the connector hood 24a. The positioning groove 62 is provided with a rib 64 that protrudes to the inside of the connector hood 24a and extends through the whole length of the positioning groove 62. The rib 64 serves to position the connector 70a (mentioned after) in the connector hood 24a more stably and to reduce the contact area between the connector 70a and the positioning groove 62, so that the connector 70a can be inserted into and drawn from the connector hood 24a more easily.

The connector hood 24a is provided on each of a pair of wall portions 46b and 46c, which constitute short sides of the connector hood 24a, with a lock pawl 66 that protrudes to the inside of the connector hood 24a. Further, the connector hood 24a is provided on its outer peripheral surface with a plurality of triangular reinforcement ribs 68.

Figure 6:
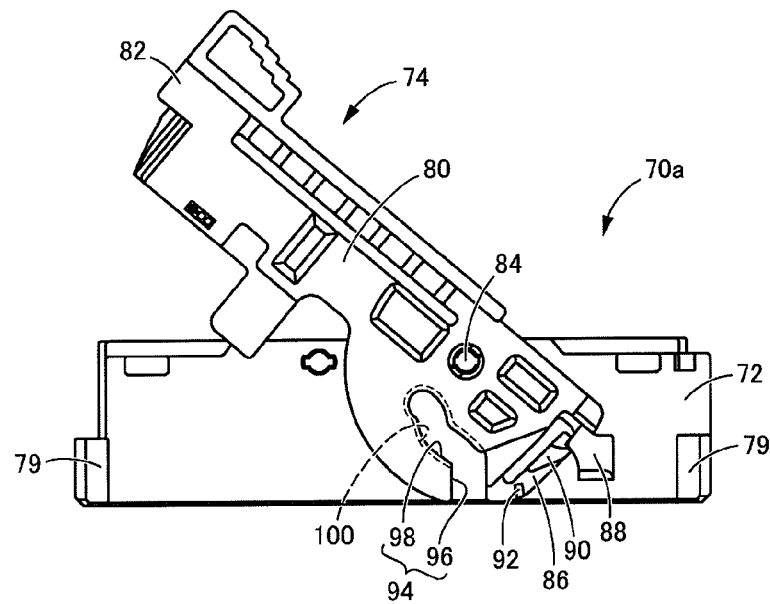
FIG. 6 is a side elevation view of a connector to be connected to the electrical junction box shown in FIG. 1.
Figure 7:
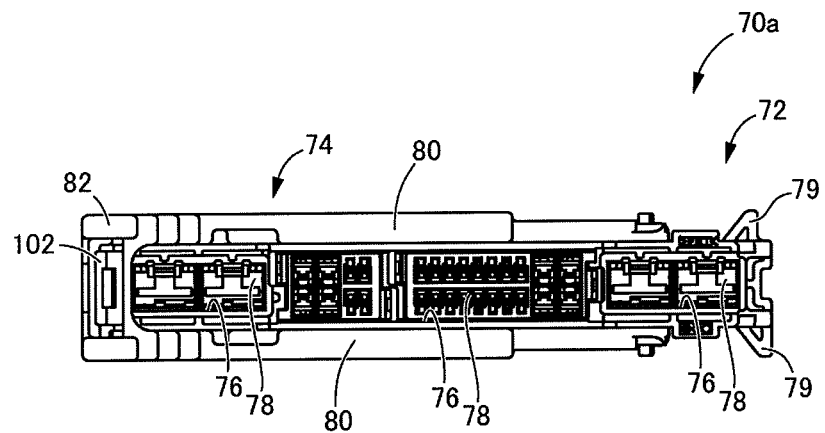
FIG. 7 is a plan view of the connector shown in FIG. 6.

The lever type connector 70a shown in FIGS. 6 and 7 is mounted on the connector-mounting section 22a for the lever type connector. FIG. 6 shows a released position of a lever 74 (mentioned after) while FIG. 7 shows an engaged position of the lever 74.

The connector 70a includes a connector holder 72 that constitutes a connector main body, and a lever 74 rotatably coupled to the connector holder 72. The connector holder 72 is formed into a rectangular block-like configuration provided with a plurality of connector-containing portions 76 that are open upward (upper direction in FIG. 6). The connectors 78 are contained and held in the connector-containing portions 76 by lock mechanisms such as lances known in the prior art. Thus, the lever type connector 70a can hold the plural connectors 78 in the connector holder 72.

The connector holder 72 is provided on each of its opposite ends in a longitudinal direction (right and left directions in FIG. 7) with a latch projection 79 that protrudes outward from each of opposite sides in a width direction (upper and lower directions in FIG. 7) of the connector holder 72. As shown in FIG. 6, each latch projection 79 is formed into a block-like configuration that extends upward from a lower end (lower end in FIG. 6) of the connector holder 72 by a given dimension. Specifically, a dimension in upper and lower directions of the latch projection 79 is substantially the same as that of the positioning projection 54 provided on the connector hood 24a.

On the other hand, the lever 74 is a U-shaped member in which a pair of side plates 80, 80 that are opposed to each other are coupled to each other by a connecting portion 82 at one end of the lever 74. The lever 74 is incorporated with the connector holder 72 from its outside when the side plates 80, 80 are disposed on an outer peripheral side of the connector holder 72. The lever 74 is rotatable around a rotary axle 84 provided on the connector holder 72. The lever 74 is provided with a leaf spring 86. The leaf spring 86 can slide between an outer peripheral surface of the connector holder 72 and a pocket-like latch portion 88 formed on the outer peripheral surface of the connector holder 72. When a first latch projection 90 formed on a distal end of the leaf spring 86 is engaged with a latch projection (not shown) provided on the inside of the latch portion 88, the lever 74 is held on the released position shown in FIG. 6. When the lever 74 is turned so that a second latch projection 92 formed on a proximal end of the leaf spring 86 is engaged with a latch projection (not shown) of the latch portion 88, the lever 74 is held in a fitted position (see FIG. 8B).

Each of the side plates 80, 80 is provided with a guide groove 94. The guide groove 94 penetrates the side plate 80 in its thickness direction. The guide groove 94 is open in its end edge and is disposed at a lower position of the connector 70a, when the lever 74 is in the released position. The guide groove 94 includes a leading portion 96 that extends straightly upward from the end edge in the released position by a given length, and an acting portion 98 that extends arcuately toward the inside of the side plate 80 from the leading portion 96. A recess 100 (see FIG. 10) is provided on an inner surface of the guide groove 94 to extend along a whole length of the guide groove 94. The recess 100 contains the head portion 52 of the latch projection 48 that protrudes from the connector hood 24a.

Figure 8:
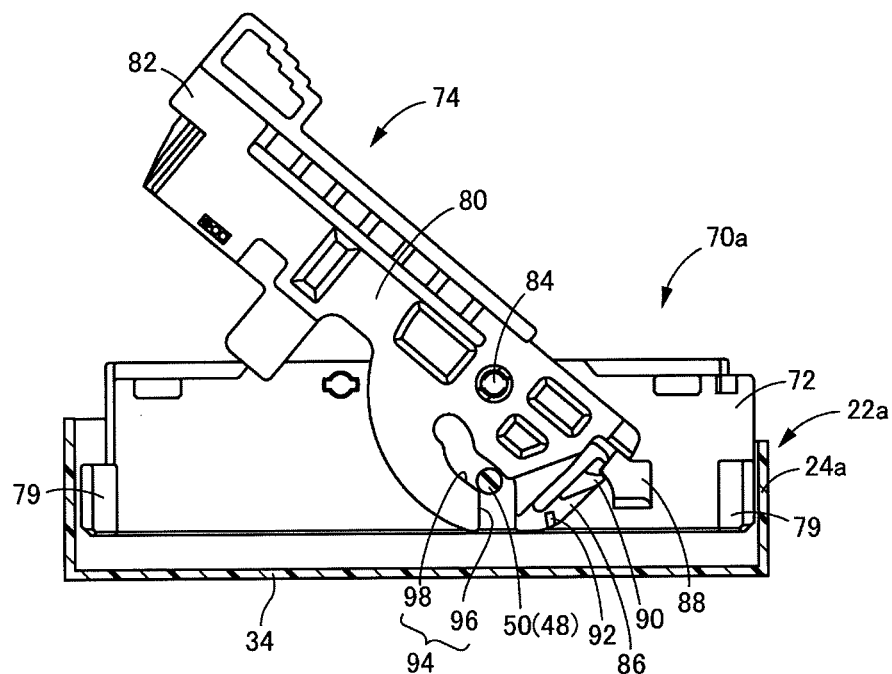
FIGS. 8A and 8B are explanatory views of the connector, illustrating an operation of coupling the connector shown in FIG. 6 to the electrical junction box shown in FIG. 1.
Figure 8:
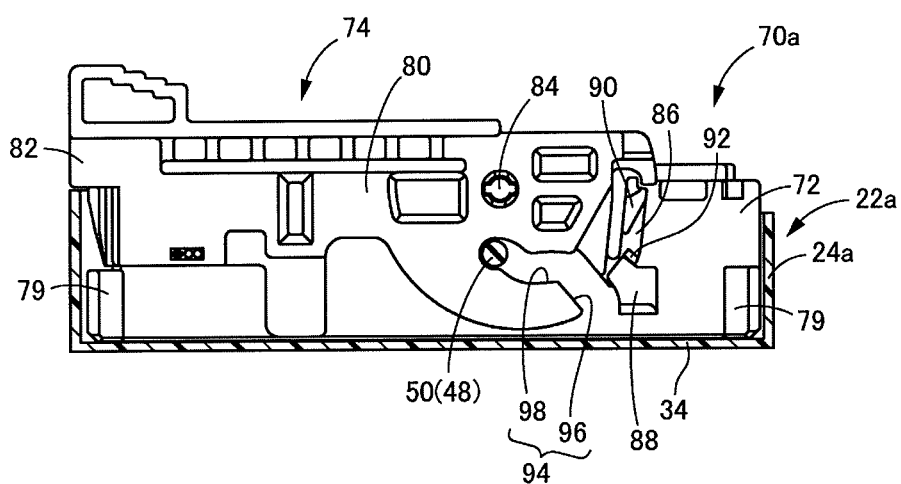

Such connector 70a is disposed on the connector-mounting section 22a. Firstly, as shown in FIG. 8A, the connector holder 72 is inserted into the connector hood 24a. Then, the insertion leg 50 of each latch projection 48 that protrudes from the connector hood 24a is inserted into the leading portion 96 of the guide groove 94. When the lever 74 is turned, the insertion leg 50 is inserted into the acting portion 98 of the guide groove 94. As shown in FIG. 8B, the connector holder 72 approaches the bottom portion 34 by a guiding action between the insertion leg 50 and the acting portion 98. Thus, each connector 72 contained in the connector holder 72 is coupled to the connecting terminals 32 that protrude from the bottom portion 34 and the connector 70a is housed in the connector hood 24a. In the case where the connector 70a is drawn out of the connector hood 24a, when the lever 74 is returned to the released position (see FIG. 6), the connector holder 72 is spaced away from the bottom portion 34 by a guiding action between the guide groove 94 and the latch projection 48.

Figure 9:
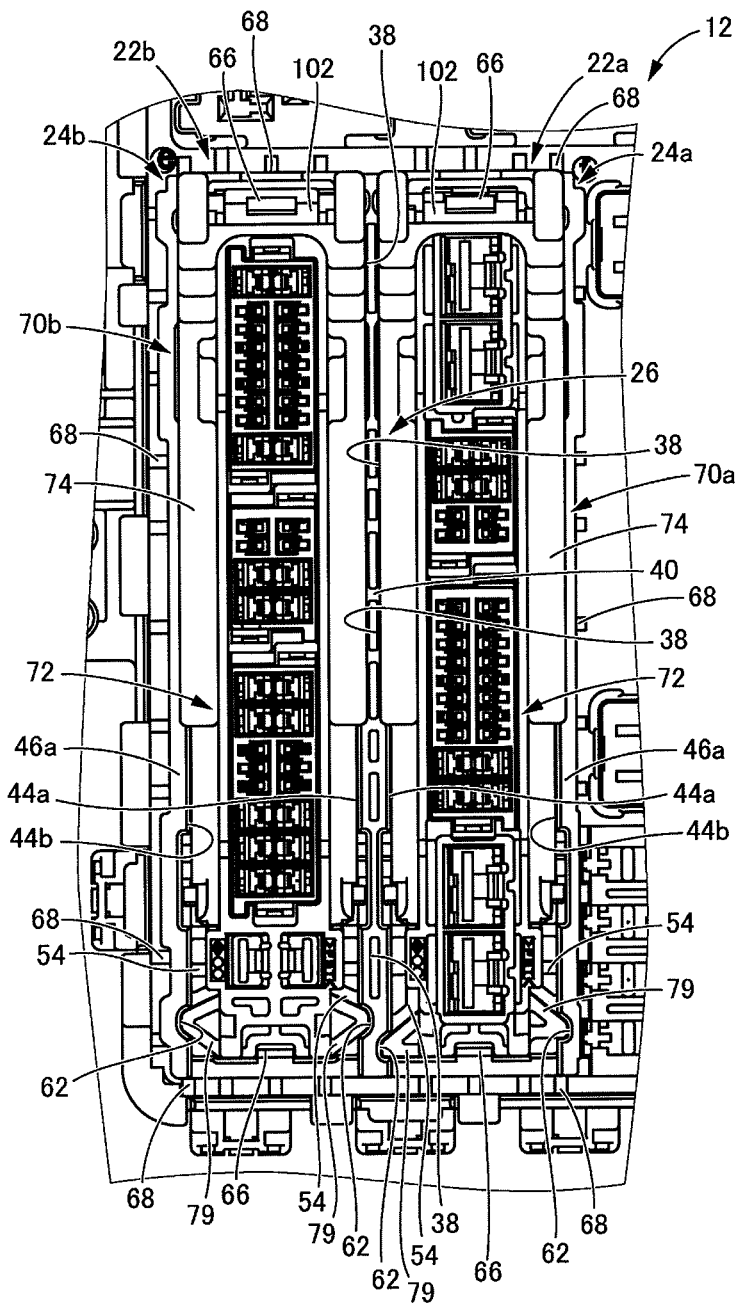
FIG. 9 is an enlarged plan view similar to FIG. 2, illustrating the electrical junction box to which the connectors are coupled.

Although a detailed illustration is omitted in the drawings, a lock portion 102 (see FIG. 7) is provided on a coupling portion 82 on the lever 74 of the connector 70a. Thus, while the connector 70a is contained in the connector hood 24a, the lock portion 102 engages the lock pawl 66 on the connector hood 24a to prevent the lever 74 from being rotated inadvertently. As shown in FIG. 9, while the connector 70a is housed in the connector hood 24a, the connector holder 72 of the connector 70a is pinched by the positioning projections 54, and the latch portion 79 that protrudes from the connector holder 72 is fitted into the positioning groove 62.

The lever type connector 70b is disposed on the connector-mounting section 22b for the lever type connector. Since the lever type connector 70b is substantially the same as the lever type connector 70a, a detailed explanation of the lever type connector 70b is omitted here by giving the same signs in the lever type connector 70a to the connector 70b. The connector 70b is different from the connector 70a with respect to configurations of the connector-containing portion 76 in the connector holder 72 and the connector 78 housed in the portion 76. Furthermore, the connector 70b is different from the connector 70a with respect to a position of the latch projection 79. Since a position of the positioning groove 62 in the connector hood 24b is different from the position of the connector hood 24a in connection with the above differences, it is possible to prevent the connector 70b from being inserted into the connector hood 24a by mistake.

According to the first embodiment, the lightening holes 38 are provided in the partition wall 26 on which the latch projections are formed. Thus, it is possible to increase a thickness of the partition wall 26 while avoiding an increase of an amount of a resin. The latch projections 48 are formed on the solid part 40 in which the lightening holes are not provided. Thus, it is possible to effectively obtain a support strength for the latch projections 48. In result, an engagement between the lever 74 and the latch projections 48 can prevent deflection of the partition wall 26 without increasing an amount of a resin. Also, it is possible to lower a possibility that invites an increase of cost in production in association with an increase of an amount of a resin and invites a shrinkage cavity upon molding.

Figure 10:
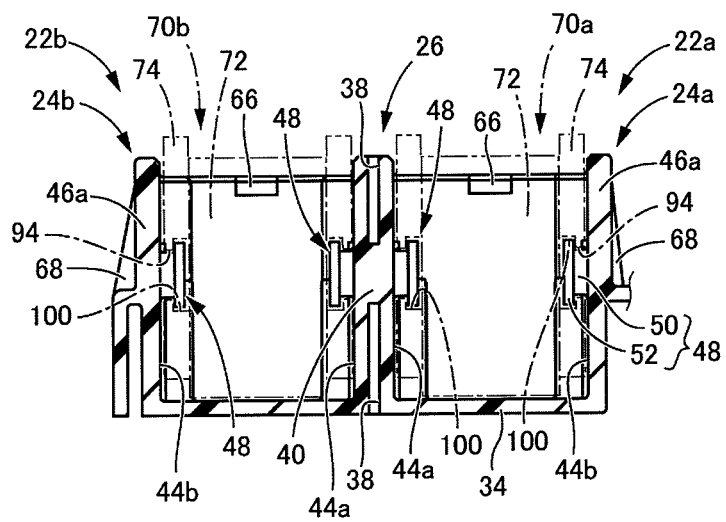
FIG. 10 is a cross section view of the electrical junction box similar to FIG. 3, illustrating the electrical junction box to which the connectors are coupled.

Furthermore, as shown in FIG. 10, the head portion 52 of each latch projection 48 is housed in a recess 100 in the guide groove 94 of the connector 70a to contact with the inner surface of the guide groove 94. Thus, the lever 74 can catch the latch projections 48 and the wall portions 26 and 46a of the connector hood 24a can be effectively prevented from being inclined outward upon operating the lever 74.

In addition, in the first embodiment, two connector hoods 24a and 24b can use the common partition wall 26 so that the hoods 24a and 24b are disposed adjacent to each other. The latch projections 48, 48 protrude from the same positions on the partition wall 26 in the connector hoods 24a and 24b. Thus, for example, after the connector 70a supported on the connector-mounting section 22a for the lever type connector is engaged with the latch projections 48, 48 that protrude from the partition wall 26, and when the connector 70b is attached to the adjacent connector-mounting section 22b, the partition wall 26 can be supported against an engagement between the connector 70b and the latch projections 48, 48 that protrude from the partition wall 26. Consequently, it is possible to further enhance a support strength for the partition wall 26.

The connector hood 24a is provided in the inner surface with the positioning grooves 62 that extend through a whole length of the connector hood 24a in the upper and lower directions. Thus, when the connector 70a is attached to the connector-mounting section 22a, it is possible to position and guide the connector 70a into the connector hood 24a by fitting the latch projections 79 of the connector 70a into the positioning grooves 62 at the time of starting a mounting work.

Since the connector 70a is pinched between the positioning projections 54, 54 provided in the connector hood 24a, it is possible to positively position the connector 70a in the connector hood 24a. In particular, since the positioning projections 54, 54 are disposed to approach the connecting terminals 32 and to protrude upward above the connecting terminals 32, for example, in the case where the connector 70a is slant inserted into the connector hood 24a, the connector 70a contacts with the positioning projections 54 before contacting with the connecting terminals 32, thereby correcting the position of the connector in the regular direction. Accordingly, it is possible to prevent the connecting terminals from contacting with the connector 70a in the slant direction.

Figure 11:
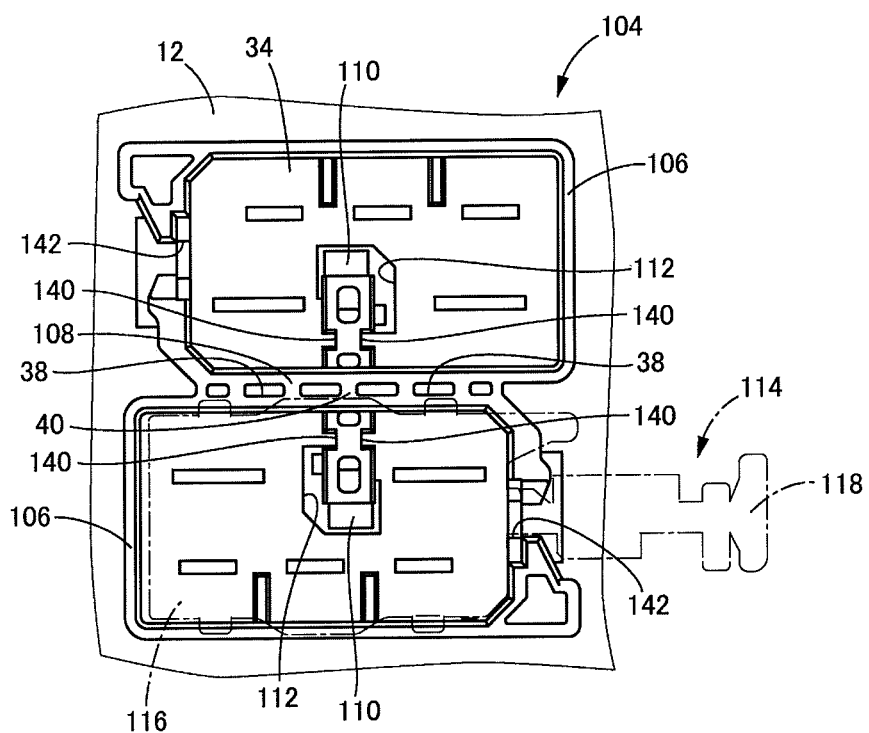
FIG. 11 is a plan view of a main part of a second embodiment of the electrical junction box in accordance with the present invention.

Next, FIG. 11 shows a main part of a second embodiment of the electrical junction box in according to the present invention. Hereinafter, if members and positions of the electrical junction box in the second embodiment are the same as those in the first embodiment, a detailed explanation of them is omitted by giving the same signs in the first embodiment to the second embodiment.

The upper casing 12 in the second embodiment is provided with a connector-mounting section 104 for the lever type connector. The connector-mounting section 104 includes two adjacent connector hoods 106, 106. These connector hoods 106, 106 have the same configurations, as is the case with the connector-mounting section 22c for the lever type connector (see FIG. 1). These connector hoods 106, 106 share a single partition wall 108 and they are adjacent to each other in a reverse direction from each other.

The lightening holes 38 are provided in the partition wall 108, as is the case with the first embodiment. Latch projections 110, 110 protrude from the solid part 40, in which the lightening holes 38 are not provided, toward the insides of the connector hoods 106, 106. In FIG. 11, a numeral 112 illustrates pattern-drawn-holes that are formed in the connector hoods 106, 106 when drawing a mold for the upper casing 12. Each connector hood 106 is not provided with the positioning projections 54 and positioning grooves 62 in the first embodiment.

Figure 12:
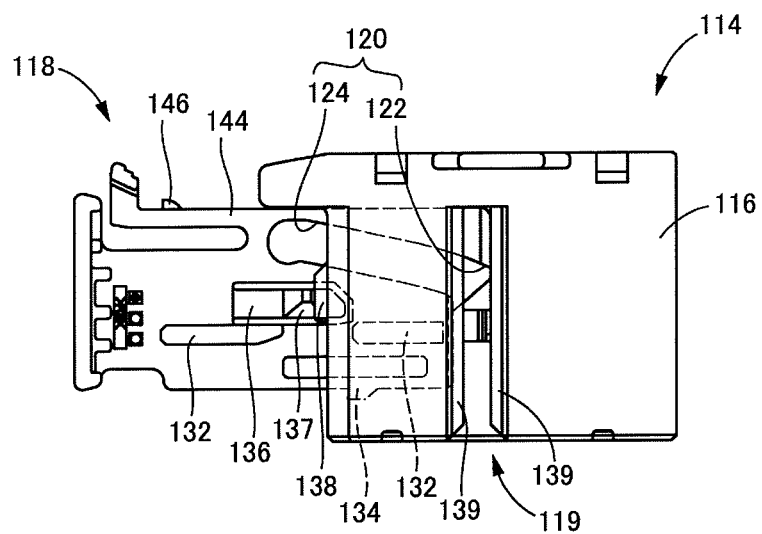
FIG. 12 is a side elevation view of the connector that is coupled to the main part of the electrical junction box shown in FIG. 11.

A lever type connector 114 (hereinafter referred to a "connector") shown in FIG. 12 is housed in the connector hood 106. The connector 114 has substantially the same configuration as that of the connector attached to the connector-mounting section 22c for the lever type connector in the first embodiment. The connector 114 includes a connector main body 116 and a lever 118 incorporated with the connector main body 116.

The connector main body 116 is substantially formed into a block-like configuration. A plurality of female terminals (not shown) are housed and held in the connector main body 116. The connector main body 116 is provided with a guide slit 119 that is open in one side surface of the connector main body 116 and extends in inserting and drawing directions (upper and lower directions in FIG. 12). On the other hand, the lever 118 is formed into a plate-like configuration, as a whole. The lever 118 is provided with a guide groove 120. The guide groove 120 includes an leading portion 122 that is open in an end edge of the lever 118, and an acting portion 124 that extends arcuately upward from the leading portion 122 in a slant direction.

The lever 118 is movably incorporated with the connector main body 116 in a direction (right and left directions in FIG. 12) perpendicular to the inserting and drawing directions of the connector 114 by guiding each guide projection 132 that extends in a pushing direction (right and left directions in FIG. 12) to the connector main body 116 by each guide groove (not shown) in the connector main body 116. When an anti-disconnection projection 134 that protrudes from a lower end of the lever 118 engages a latch projection (not shown) of the connector main body 116, the lever 118 is incorporated with the connector main body 116 so that the lever 118 does not come out of the connector main body 116. At the same time, when a first latch pawl 137 on a distal end of a first leaf spring 136 formed on the lever 118 engages a latch projection 138 on an outer surface of the connector main body 116, the lever 118 is held in a released position shown in FIG. 12. When the lever 118 is held in the released position, the leading portion 122 of the guide groove 120 is faced to an outside from the connector 114 through a guide slit 119.

Figure 13:
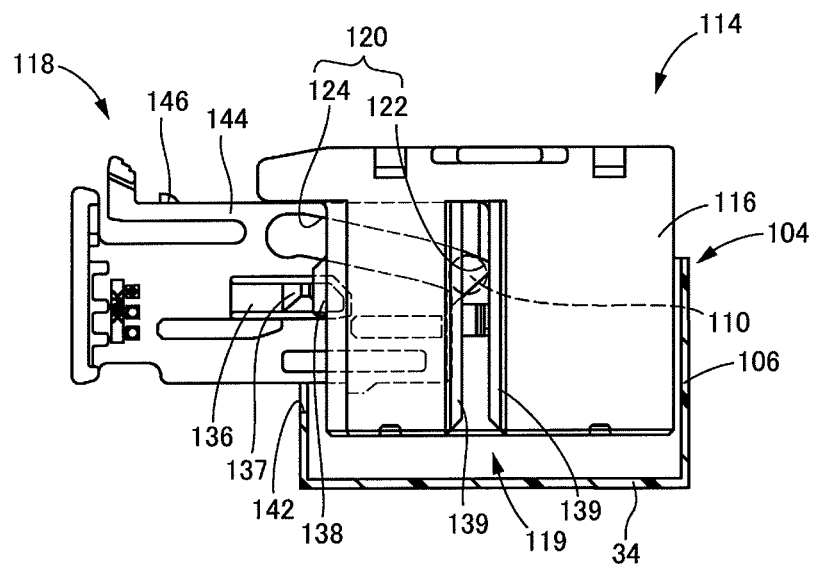
FIGS. 13A and 13B are explanatory views of the connector shown in FIG. 12, illustrating an operation of coupling the connector to the electrical junction box.
Figure 13:
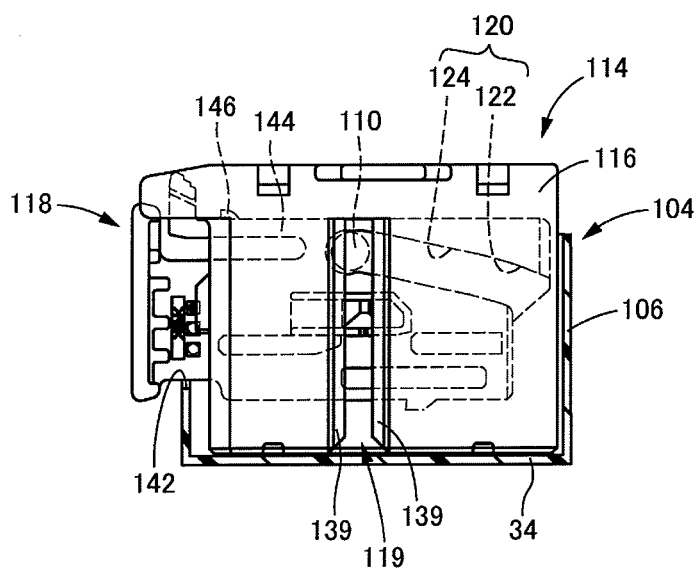

When such connector 114 is disposed on the connector-mounting sections 104 for the lever type connector, firstly, as shown in FIG. 13A, the connector main body 116 is inserted into the connector hood 106. Guide ribs 139, 139 are provide on a projecting proximal end of the latch portion 110 to protrude from an inner surface of the guide slit 119. When the guide ribs 139, 139 are inserted into and guided into guide grooves 140, 140 (see FIG. 11) that extend in the inserting and drawing directions of the connector 114, the connector main body 116 is guided in the inserting and drawing directions. Thus, the latch projections 110 are inserted into the leading portion 122 of the guide groove 120. The lever 118 set in the released position protrudes outward from the connector hood 106 through a slit-like through-hole 142 provided in the connector hood 106.

When the lever 118 is pushed to the connector main body 116 and an engagement condition between the first latch pawl 137 of the first leaf spring 136 and the connector main body 116 is released, the lever 118 is pushed into the connector main body 116. Thus, since the latch projection 110 engages the acting portion 124 of the guide groove 120, as shown in FIG. 13B, the connector main body 116 approaches the bottom portion 34 of the connector hood 106 by a guiding action between the latch projection 110 and the guide groove 120. In result, the connector main body 116 is disposed at the fitting position to be coupled to the connecting terminals 32 (not shown in FIG. 13B), thereby attaching the connector main body 116 to the connector-mounting section 104 for the lever type connector. When a second latch pawl 146 provided on a second leaf spring 144 is inserted into the connector main body 116 to be engaged with a latch portion (not shown) provided on the connector main body 116, as shown in FIG. 13B, the lever 118 is secured to the connector main body 116 so that the lever 118 does not come out from the fitting position where the lever 118 is pushed into the connector main body 116. When the lever 118 is drawn out of the connector main body 116 in order to draw the connector 114 from the connector hood 106, it is necessary to release the engagement between the second latch pawl 146 and the connector main body by operating the second leaf spring 144. When the connector 114 is drawn out of the connector hood 106, the lever 118 is drawn out of the connector main body 116 and the engagement between the guide groove 120 and the latch projection 110 exerts a guiding action, thereby removing the connector main body 116 from the bottom portion 34.

In the second embodiment, a plurality of lightening holes 38 is formed in the partition wall 108 provided with latch projections 110. The latch projections 110 are provided on the solid part 40. Thus, it is possible to obtain a support strength for the latch projections 110 and to prevent the partition wall 108 from being deflected when inserting and drawing the connector 114, without inviting an increase of an amount a resin. It will be apparent from the second embodiment that a specific configuration of a connector to be contained in the connector hood is not limited. For example, it is possible to adopt a connector in which a lever is pushed into a connector main body, as is the case with the second embodiment.

Although the embodiments of the present invention are described above in detail, it should be noted that the present invention is not limited to the above embodiments. For example, in the first embodiment, lightening holes may be provided in the wall portion 46a opposed to the partition wall 26. Although two connector hoods share a single wall portion to be disposed adjacent to each other in the first and second embodiments, individual connector hoods may be independent from each other and the present invention may be applied to the individual connector hoods.

EXPLANATION OF SIGNS

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. An electrical junction box comprising:
a connector hood configured to contain a connector;
a latch projection protruding from a wall portion of said connector hood toward the inside of said connector hood, said latch projection configured to guide and displace said connector in insertion and withdrawal directions with respect to said connector hood when said latch projection engages a guide groove in a lever provided on said connector during operation of said lever; and a plurality of lightening holes provided in said wall portion, said latch projection being supported on a solid part of said wall portion that does not include said lightening holes, wherein a plurality of said connector hoods are provided adjacent to one another, said wall portion includes partition walls between said adjacent connector hoods, said lightening holes are provided in said wall portion, and a plurality of latch projections protrude from said solid part toward the insides of said adjacent connector hoods, and wherein said latch projections that protrude toward the insides of said connector hoods are disposed at corresponding positions on said wall portion that includes partition walls between said adjacent connector hoods, and said latch projections are coupled together to one another through said solid part.

2. An electrical junction box according to claim 1, wherein said latch projection includes an insertion leg configured to be inserted into said guide groove in said lever, and a head portion projecting from a distal end of said insertion leg, a width of the head portion being larger than a width of said guide groove.

3. An electrical junction box according to claim 2, wherein positioning projections are provided on said connector hood so that said positioning projections pinch and position said connector in said connector hood.

4. An electrical junction box according to claim 2, wherein the positioning groove is provided in a wall from which said latch projection protrudes in said connector hood, said positioning groove is open in a projection end surface of said wall and extends in a depth direction of the connector hood, and the fitting projection provided on said connector is coupled to said positioning groove upon engagement of the connector with the connector hood.

5. The electrical junction box according to claim 1, said connector hood being generally rectangular and including a plurality of positioning grooves, said connector including a corresponding plurality of fitting projections, each of the positioning grooves and the corresponding fitting projections being positioned adjacent a corner of the said connector hood.

6. The electrical junction box according to claim 1, each of the positioning grooves extending outwardly of a side wall of the connector hood and being open to the interior of the connector hood.

7. The electrical junction box according to claim 1, further comprising a positioning projection that projects upwardly from a bottom wall of said connector hood and is positioned adjacent the positioning groove, said positioning projection extending inwardly in a direction opposite to an extending direction of said positioning groove.

8. An electrical junction box according to claim 1, wherein positioning projections are provided on said connector hood so that said positioning projections pinch and position said connector in said connector hood.

9. An electrical junction box according to claim 1, wherein a positioning groove is provided in a wall from which said latch projection protrudes in said connector hood, said positioning groove is open in a projection end surface of said wall and extends in a depth direction of the connector hood, and a fitting projection provided on said connector is coupled to said positioning groove upon engagement of the connector with the connector hood.

10. An electrical junction box comprising:

a connector hood configured to contain a connector;

a latch projection protruding from a wall portion of said connector hood toward the inside of said connector hood, said latch projection configured to guide and displace said connector in insertion and withdrawal directions with respect to said connector hood when said latch projection engages a guide groove in a lever provided on said connector during operation of said lever; and a plurality of lightening holes provided in said wall portion, said latch projection being supported on a solid part of said wall portion that does not include said lightening holes, wherein said latch projection includes an insertion leg configured to be inserted into said guide groove in said lever, and a head portion projecting from a distal end of said insertion leg, a width of the head portion being larger than a width of said guide groove, wherein a plurality of said connector hoods are provided adjacent to one another, said wall portion includes partition walls between said adjacent connector hoods, said lightening holes are provided in said wall portion, and a plurality of latch projections protrude from said solid part toward the insides of said adjacent connector hoods, and wherein said latch projections that protrude toward the insides of said connector hoods are disposed at corresponding positions on said wall portion that includes partition walls between said adjacent connector hoods, and said latch projections are coupled together to one another through said solid part.

11. An electrical junction box according to claim 10, wherein positioning projections are provided on said connector hood so that said positioning projections pinch and position said connector in said connector hood.

12. An electrical junction box according to claim 10, wherein a positioning groove is provided in a wall from which said latch projection protrudes in said connector hood, said positioning groove is open in a projection end surface of said wall and extends in a depth direction of the connector hood, and a fitting projection provided on said connector is coupled to said positioning groove upon engagement of the connector with the connector hood.

13. The electrical junction box according to claim 10, each of the positioning grooves extending outwardly of a side wall of the connector hood and being open to the interior of the connector hood.

14. The electrical junction box according to claim 10, further comprising a positioning projection that projects upwardly from a bottom wall of said connector hood and is positioned adjacent the positioning groove, said positioning projection extending inwardly in a direction opposite to an extending direction of said positioning groove.

15. The electrical junction box according to claim 10, said connector hood being generally rectangular and including a plurality of positioning grooves, said connector including a corresponding plurality of fitting projections, each of the positioning grooves and the corresponding fitting projections being positioned adjacent a corner of the said connector hood.

\* \* \* \* \*